United States Patent [19]

Harrison

[11] Patent Number: 4,764,399

[45] Date of Patent: Aug. 16, 1988

[54] METHOD OF PRINTING THERMOPLASTIC ARTICLES WITH THERMOPLASTIC INK

[75] Inventor: Peter Harrison, Ossett, England

[73] Assignee: Plastona (John Waddington) Limited, Yorkshire, England

[21] Appl. No.: 893,722

[22] Filed: Aug. 6, 1986

[30] Foreign Application Priority Data

May 29, 1986 [GB] United Kingdom ............... 8613050

[51] Int. Cl.$^4$ ............................................. B05D 3/08
[52] U.S. Cl. ................................ 427/275; 101/426; 264/132; 427/224; 427/316
[58] Field of Search .............. 101/35, 41, 426, 32; 427/375, 261, 200.2, 256, 316, 224, 275; 264/132

[56] References Cited

U.S. PATENT DOCUMENTS

| | | |
|---|---|---|
| 2,486,259 | 10/1949 | Chavannes ................. 101/426 X |
| 2,558,791 | 7/1951 | Smith et al. ................ 101/426 X |
| 2,594,290 | 4/1952 | Chavannes ................. 101/426 X |
| 2,998,332 | 8/1961 | Osdal ......................... 101/426 X |
| 3,666,519 | 5/1972 | Bayer. | 
| 3,933,547 | 1/1976 | Yoshida et al. ............... 427/224 X |
| 4,079,673 | 3/1978 | Bernstein ..................... 101/426 |

FOREIGN PATENT DOCUMENTS

| | | |
|---|---|---|
| 131288 | 7/1985 | Japan ............................ 101/426 |
| 774891 | 5/1957 | United Kingdom. |
| 1076698 | 7/1967 | United Kingdom ............. 101/426 |
| 1120629 | 7/1968 | United Kingdom. |
| 2016374A | 9/1979 | United Kingdom. |

*Primary Examiner*—Clifford D. Crowder
*Attorney, Agent, or Firm*—Klauber & Jackson

[57] ABSTRACT

Plastics articles, such as plates, bowls, cups and the like which are for containing foodstuffs and are useable in freezers, and microwave and conventional cooking ovens, are of crystalline polyethylene terephthalate rendering them suitable for such purposes, and the articles are decoratively printed using inks containing thermoplastic resin binders and pigments, and the pigment is keyed firmly to the articles to prevent ready removal therefrom by abrading by heating the applied ink by means of a naked flame quickly to bring the resin binder up to its melting point so that the binder and article become bonded together keying the pigment to the article.

15 Claims, No Drawings

METHOD OF PRINTING THERMOPLASTIC ARTICLES WITH THERMOPLASTIC INK

This invention relates to the printing of shaped plastics material articles, and has particularly reference to the printing of those plastics material articles which are thermoformed from sheet material i.e. they are produced by heating sheet material to soften same, followed by the formation of the sheet into the shape of the article in suitable thermoforming machinery. Typical of such articles are plates, cups, dishes useable as domestic hollow-ware, and lids therefor.

The invention can however be applied to articles produced by other forming techniques, such as injection moulding, blow moulding or the like. In any of these forming techniques it is a simple matter to provide the articles with embossed patterns, by a simple shaping of the mould.

It is of course already known to print plastics material articles to which the invention relates, by a variety of printing techniques such as flexographic, gravure, tampoprint, roll-on printing, offset, litho and after the application of the ink material, the article is subjected to a treatment in order to fix the ink to the article so that it becomes as permanently bonded to the article as possible. It is especially important that the ink material should bond to the article when it is for use as domestic hollow-ware.

Inks are accordingly selected so that they will have good adhesion to the plastics material articles, and in one known arrangement, the ink is printed on the plastic articles which are then subjected to heat in order to drive off the solvents. The plastics material articles which have been used in this process have however been of a nature so that they have general utility but are not capable of withstanding high temperatures, and accordingly the heating to drive off the solvents has had to take place at relatively low temperature i.e. of the order of 40° C. and over a relatively long period.

On the other hand, some plastics bottles have been printed by pre-heating the surface to which the printing is to be applied, in order to condition the plastics material in the region to which the printing is to be applied, in order to give a permanent bonding of the ink to the surface, followed by subsequent heating of the print ink material in order to effect cross-linking between material of the ink with the plastics material of the bottle. Such processes have been carried out at high temperature, but such inks can only be used on such as the external surfaces of bottles and the inks are unsuitable for coming into contact with foodstuffs.

With the increase in consumption at least in the Western world of convenience foods and pre-packaged foods which have to be capable of being freezer frozen on the one hand, and heated either by microwave energy or by conventional oven heating on the other hand, there has been created a demand for the provision of shaped plastics material articles such as trays and cups which have to be what is called "ovenable" which in that they must be of a nature capable of withstanding normal oven cooking temperatures (200°–220° C.). These ovenable materials are also frequently required to withstand the low temperatures (of the order of −40° C.) normally experienced in freezers, and also often are required to be reuseable and reheatable in microwave ovens. As a result, plastics material articles substantially of crystalline polyethylene terephthalate (CPET) have been produced, because this material is capable of withstanding freezer temperatures, and oven cooking temperatures. By "crystalline" as applied to CPET is meant a material having no more than 35% crystallization. If the material is crystallised to any extent substantially above 35%, then it tends to become too brittle to be useful for normal domestic handling. In the case of articles thermoformed in CPET, the crystallization is normally produced in the moulding process, the PET material supplied to the moulding machine being substantially amorphous.

With the widespread use of CPET articles for foodstuffs, there has arisen a demand that the articles should be printed for decoration and/or to carry advertising or information but this demand for printing brings special problems to this type of article, because on the one hand, when the printing is to be on a part of the article or near to a part of the article which carries foodstuff, then it is important that the printing ink should on the one hand be of such a quality as not to have any deleterious effects if accidentally consumed by humans, and on the other hand the ink material should be effectively bound to the plastics material article so as not to become detached therefrom when in use.

If either of the abovementioned conventional techniques were used for printing plastics material articles which have to be "ovenable" in other words they have to be capable of withstanding the conventional oven temperatures which are used in the oven baking of foodstuffs, then satisfactory results are not obtained, because if the solvent based inks were used for the printing, then on the one hand the inks are unsuitable from the point of view of human consumption, but on the other hand the inks do not have sufficient affinity and bonding strength to the somewhat hard crystallised material of the plastics material article. If the known cross-linking technique were used, then again difficulties would be encountered insofar as the ink which is used in the cross-linking technique is unsuitable for human consumption and would not be given approval by the authorities for use in connection with articles for carrying foodstuffs, but on the other hand, the various heating stages would cause excessive crystallization of the plastics article.

It can be seen therefore that there is no ready solution for the provision of printing effectively of ovenable plastics material articles, but the present invention provides such a solution.

According to the present invention, an ovenable plastics material article is printed using a printing ink containing a synthetic resin binder and pigment, and then the printed article is subjected to heat at least in the vicinity of the printing sufficient to melt the resin binder, the resin binder being compatable with the material of the article so that the binder and material of the article fuse together anchoring the pigment to the article.

Where the pigment is to be used in a location contacting or close to contacting foodstuff, the pigment is preferably a pigment which is of a type acceptable for coming into contact with foodstuffs.

The time during which the heat is applied in order to melt the resin binder need only be sufficient in order to achieve the melting of the binder and therefore if heat involving the use of a high temperature source such as a flame is involved, then the period during which the heat is applied may be quite short, and indeed this is the preferred method of applying the heat. The heat can be applied by placing the articles in an oven and raising the temperature of the oven to a sufficient level e.g. of the order of 160°–180° C., in order to melt the resin binder, but the shortcoming of this method of heating is that it may increase the crystallinity of the plastics material article, if it is indeed a CPET article. It is important that the intrinsic viscosity (I.V.) of the polyester material is maintained to ensure the binding of the pigment to the plastics material. The printing ink preferably comprises thermoplastic resin, synthetic iron oxide pigment and solvent; the resin preferably being a polyester resin.

It is not necessary that the article should be of CPET, or substantially of CPET as it is not unusual to include small amounts of additives, and indeed other ovenable plastics material can be used for the articles. Such other materials include but are not limited to polycarbonates, polysulphones, and phenolics. The article is preferably of PET, crystallized to a crystallization level of the order of 22 to 32%.

The article may be formed with an embossed pattern, and the ink may be applied thereto by roller on the raised portions of the embossed pattern, the embossed region being flame heated in order to melt the resin of the ink.

Where the ink is applied to an embossed pattern on the rim of say a plastics material plate, then the heating of the rim may be effected by means of a flame heater located in the region of the rim which heats only a section of the rim, and by rotating either the heater or the rim the entire rim is heated, but this is only an example of how one form of printing can be heated in order to fix the pigment. The heat is applied only for a sufficient time to melt the thermoplastic resin.

In carrying out tests using the method of the invention, and using a resin binder ink as sold by Coats Inks Limited under the trade name POLYGLAZE upon the rim of a plate substantially of CPET, extremely effective results have been achieved and the resin binder has melted and bonded to the CPET giving the pigment a somewhat glazed appearance so that there is the impression that the ink pigment has been enamelled to the plastics material of the plate.

It is not necessary that a pigment acceptable for contacting foodstuffs be used although this would be insisted upon by the authorities if the ink is likely to contact or be close to contact foodstuff to be held by the plastics article. However, if the printing is to be for example on the underside of say a plastics plate which is of clear plastics material, then it may not be necessary to use such a pigment.

If the printing on the plastics material article is made permanent in accordance with the invention by heating the article in an oven at a sufficient temperature to melt the ink binder, it may be that the article will experience, in the case of CPET articles, additional crystallization, and in such case it may be advisable not to use such articles in the refrigerator because of the brittleness of same, and therefore the most preferred form of the invention involves local heating of the article in those areas to which printing has been applied, and it is most desirable that the heat be applied by means of a high temperature source such as a flame for a relatively short period of time i.e. a period of time only sufficient to melt the resin binder, but not so long as to cause melting of the plastics material article or disintegration of the article.

After the heat has been applied to melt the resin, it is necessary that the article be cooled to fix the pigment. Such cooling may be forced cooling using cold air draughts or jets, cooling by chilling, or the articles may be allowed to cool down naturally.

I claim:

1. A method of printing a shaped article of ovenable plastics material having a surface, comprising the steps of:
   (a) providing an ink containing a pigment and a thermoplastic resin binder;
   (b) applying the ink to the article only in at least one selected location which is less than the entire surface of said article;
   (c) applying heat from a heat source to the article only in each location to which the ink has been applied to a sufficient temperature to cause the thermoplastic resin binder of the ink to melt and fuse to the plastics material of the article while avoiding damage to the plastics material of the article, and
   (d) cooling the article.

2. A method according to claim 1, wherein the article is of polyethylene terepthalate (PET), crystallized to a crystallization level of the order of 22 to 32%.

3. A method according to claim 2, including the step of applying ink comprising:
   Polyester resin
   Synthetic iron oxide pigment
   Solvent.

4. A method according to claim 3,
   wherein the heating of the article only in
   each location to which the ink has been applied is by means of a flame.

5. A method according to claim 4, wherein the pigment of the ink is edible.

6. A method according to claim 2 or 3, including the steps of forming an embossed pattern on the article, applying the ink by roller on the raised portions of the embossed pattern, and flame heating the embossed regions only in order to melt the resin of the ink.

7. A method according to claim 6, wherein the article is a plate and the embossed pattern is on the rim.

8. A method according to claim 7, including the step of using a flame heater which heats only a section of the rim of the plate at any one time and relatively moving the plate and heater to heat the entire rim.

9. A method according to claim 8, wherein the heater is held stationery and the plate is rotated.

10. A method according to claim 8, wherein the flame is applied to the rim only for sufficient time to melt the thermoplastic binder of the resin.

11. A method according to claim 1, wherein the thermoplastic resin is a polyester resin.

12. A method according to claim 1, wherein the article is of ovenable plastics taken from the following:
    Crystalline Polyester
    Polycarbonates
    Polysulphanes
    Phenolics.

13. A method according to claim 12 wherein the resin is heated to at least 160° C.

14. A method of printing a shaped article of polyethylene terephthalate (PET) plastics material having a surface, comprising the steps of:
    (a) providing an ink containing a pigment and a thermoplastic resin binder;
    (b) applying the ink to the article only in at least one selected location which is less than the entire surface of said article;

(c) heating the article only in each location to which the ink has been applied to a sufficient temperature to cause the thermoplastic resin binder of the ink to melt and fuse to the plastics material of the article while avoiding damage to the plastics material of the article, and (d) cooling the article.

15. A method of printing a shaped article of polyethylene terephthalate (PET) material having a surface, comprising the steps of:

(a) providing an ink containing pigment and a thermoplastic resin binder;

(b) applying the ink to the article only in at least one selected location which is less than the entire surface of said article;

(c) applying heat from a heat source to the article only in each location to which the ink has been applied to a sufficient temperature by means of a heating source and by moving the article relative to the heating source to cause the thermoplastic resin binder of the ink to melt and fuse to the plastics material of the article while avoiding the damage to the plastics material of the article, and (d) cooling the article.

* * * * *